March 25, 1941.  J. KATZMAN  2,236,270
ELECTROLYTIC CONDENSER
Filed Oct. 18, 1937
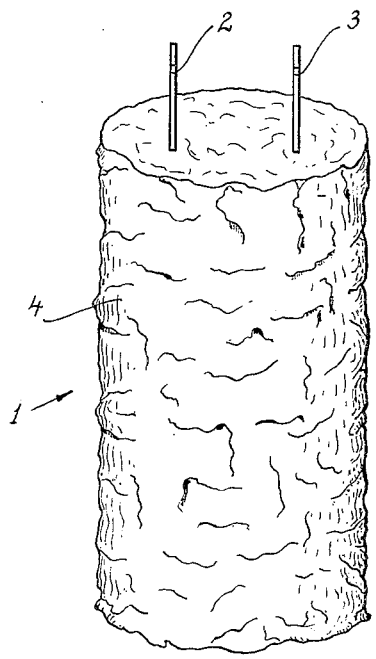
INVENTOR
Jacob Katzman
BY
ATTORNEY.

Patented Mar. 25, 1941

2,236,270

UNITED STATES PATENT OFFICE 2,236,270

ELECTROLYTIC CONDENSER

Jacob Katzman, Brooklyn, N. Y., assignor to Nova Electric Corporation, New York, N. Y., a corporation of New York Application October 18, 1937, Serial No. 169,688

3 Claims. (Cl. 175—315)

My invention relates to electrical condensers and more particularly relates to novel electrolytes for and methods of construction of electrolytic condensers.

This application is a continuation-in-part of my co-pending applications Serial No. 728,273, filed May 31, 1934 which matured into Patent No. 2,096,673 on October 19, 1937, and Serial No. 752,030 filed November 8, 1934.

An electrolytic condenser comprises primarily a negative foil, a positive foil, and an absorbent spacer impregnated with an electrolyte in the case of the so-called dry or semi-dry electrolytic condenser. The foils preferably are made of aluminum, particularly the positive foil, although as is well known in the art, other film-forming materials may be used such as tantalum, molybdenum, magnesium, etc. The positive foil is usually preformed, that is, the dielectric coating is put on the foil prior to the time that it is incorporated in the condenser, though a preformed foil is not absolutely essential in the construction of an electrolytic condenser, provided the positive foil is of a film-forming material and the electrolyte is a suitable chemical.

The completed condenser consists of the positive foil, the dielectric coating consisting of an oxide and/or hydroxide of aluminum, if aluminum is the positive foil, an electrolyte such as dilute solution of boric acid and borax, or glycerine and ammonium borate, or any other suitable electrolyte and a negative foil. The positive foil forms the positive plate of the condenser, the oxide and hydroxide coating with or without occluded gases forms the dielectric of the condenser, while the electrolyte constitutes the negative electrode of the electrolytic condenser; the metallic negative plate merely serves as a "lead-in" for the electrolyte electrode.

I have discovered a novel electrolyte for electrolytic condensers composed of an alcohol such as glycerine or ethylene glycol mixed with a citrate such as citric acid or ammonium citrate or a combination of such citrates and boiled together. Such electrolyte permits relatively higher working voltages than prior electrolytes for electrolytic condensers.

I have further discovered that by subjecting the completed condenser to a temperature of about 300° F. for a short period of about ten minutes, the life and qualities of the condenser are materially improved.

The qualities sought for in an electrolyte are: a relatively high breakdown voltage; a non-corrosive action on the foil or plates; a higher stable dielectric film; and a cheap and simple manufacture thereof.

Accordingly an object of my invention is to provide a novel electrolyte having these properties for an electrolytic condenser.

Another object of my present invention is to provide a novel electrolyte for electrolytic condensers comprising alcohol and a citrate.

A still further object of my invention is to provide a novel electrolytic condenser in which deforming is substantially eliminated.

Still another object of my invention is to provide a novel method for preserving the life of an electrolytic condenser by high temperature firing.

A further object of my invention is to provide an electrolytic condenser using absorbent Cellophane as a carrier for the electrolyte.

These and further objects of my present invention will become apparent in the following description of my invention in connection with the drawing, in which the figure is a perspective view of my improved condenser:

Referring to the drawing, the condenser 1 having alternate layers of positive electrode, electrolyte impregnated spacer, negative electrode and electrolyte impregnated spacer is of the usual construction. Electrode terminals 2 and 3 connected to the positive and negative electrodes respectively protrude through a protective crust 4 which has been formed in the condenser outer surface in the manner described in more detail hereinafter.

I have discovered that a solution comprising sixty parts of an alcohol such as glycerin or ethylene glycol, when mixed with a citrate such as citric acid or ammonium citrate or a combination of such citrates and boiled, will combine to produce an electrolyte having the desirable properties of an electrolyte described above. Preferably the proportions of the alcohol and the citrate are in the ratio by weight of sixty to forty respectively. This mixture is then boiled until all the citric acid has been taken up by the glycerin to produce a chemical reaction, forming a glycerol or glycol citrate. The ratio of glycerin to the citric acid may vary from 90 parts by weight of glycerin to 10 parts of citric acid to 10 parts by weight of glycerin for relatively low voltage condensers (150 v.) to 90 parts of citric acid for high voltage condensers (500 v.).

The electrolyte may be used to impregnate the electrolytic condensers of the so-called dry type as is done at present with other electrolytes, or the electrolytes may be used in the wet type electrolytic condenser. When used in the wet electrolytic condenser, it may be advisable to thin the solution by changing the ratio of the glycol with respect to the citrate, that is, by using a large percentage of glycol, either by increasing the amount of glycol or decreasing the amount of citrate. Distilled water may be added to produce an electrolyte for the so-called wet electrolytic condenser. The amount of water to be added may be varied widely depending upon the shape of the positive plate (or the closeness of convolutions; i. e., space available between surfaces of positive plates) for permitting gases to escape.

In accordance with my novel method of manufacture, I first place the mixture of an alcohol such as glycerin, and a citrate such as citric acid, in an open aluminum vat and heat to a boiling point at a temperature of approximately 250°. The boiling continues until all the citric acid has gone into and been taken up by the glycerin. Thereafter, boiling is continued for approximately ten minutes. The electrolyte is now ready for use.

The electrolyte may be used for impregnating electrolytic condensers in a manner well known in the electrolytic condenser art such as, for example, employed with an alkaline metallic salt of glyceryl borate or the ammonium salt of glyceryl borate alone or together with a mixture of glyceryl borate. One method of impregnating condenser by my novel electrolyte is described in my Patent No. 2,096,673 referred to above where the condenser construction permits the rolling up of the condenser and impregnation thereof in the rolled up form. This electrolytic condenser has a narrow strip which permits impregnation by the electrolyte through the wound up edges of the condenser. Such condensers are placed in the vat containing boiling electrolyte. While boiling continues, the rolled condensers are left in the electrolyte for a period of approximately one half hour. The electrolyte is then allowed to cool to about 20° above room temperature. The contraction of the solution during cooling assists in completely impregnating the condensers. It is to be understood, however, that my novel electrolyte may be used for impregnating electrolytic condensers by a continuous impregnation of the spacer or any other known impregnation method. The electrolytic condenser will be of the dry type or of the wet type in accordance with the viscosity of the electrolyte as hereinabove described.

One theory explaining the action of electrolytic condensers assumes that on the aluminum foil there is an oxide and/or a hydroxide film covering the positive of the aluminum foils. This film is supposed to constitute the dielectric of the condenser.

When an electrolytic condenser is in disuse for some time, it "deforms." The theory is that the dielectric film, that is, the oxide and hydroxide film, dissolves in the electrolyte. In other words, chemically speaking, the formation and deformation of the film is a reversible chemical reaction. I propose to eliminate, or at least limit, the reverse reaction by incorporating in the electrolyte a quantity of aluminum hydroxide, so that all the hydroxide that the electrolyte can hold will already be there. Therefore, the electrolyte will be incapable of dissolving the hydroxide of the film.

The aluminum hydroxide is preferably added to the electrolyte in a powdered form. It is to be understood that aluminum hydroxide is used to prevent deforming and is particularly adaptable for the dry or semi-dry type of electrolytic condenser. This treatment for deforming prevention is fully described in my co-pending application Serial No. 752,030, filed November 8, 1934. It would then be possible for the electrolyte to hold more of the hydroxide and therefore, more of the film may be dissolved despite the fact that the electrolyte was allowed to take up all of the hydroxide prior to its incorporation in the spacer of the electrolytic condenser. I therefore have found that even better results are obtained by incorporating aluminum hydroxide in the pulp of the paper used in making the absorbent layers between the foils of the electrolytic condenser. This paper then has a sufficient quantity of aluminum hydroxide in intimate contact with the electrolyte so as to minimize the dissolving action upon the film of the positive aluminum plate.

Furthermore, I have found that I can incorporate in the pulp, prior to its making into paper, other salts or powders or chemicals or waxes that will serve to assist in the making of electrolytic or electrostatic condensers by either cheapening the process or producing better results. For example, powdered waxes may be incorporated in it to facilitate making electrostatic condensers. Ammonium borate, boric acid, ammonium citrate, or any other ionogen may similarly be incorporated to produce better and cheaper electrolytic condensers. By incorporating one or more of these chemicals, it is possible to obtain within the condenser structure a sufficient quantity of salts to produce very readily a dry or semi-dry electrolytic condenser wherein the spacer between the aluminum foils would thoroughly and uniformly have the desired electrical properties.

I have discovered that after the electrolytic condenser of the so-called dry or semi-dry variety has been completed in the conventional manner that its useful life may be greatly increased in the following manner: After the electrolytic condenser is wound and impregnated by an electrolyte such as of the glyceryl borate or glyceryl citrate type or any other equivalent electrolyte, it is subjected to an elevated temperature of the order of 300° F. for a relatively short interval such as ten minutes. This heat treatment forms a caking on the outer portions of the electrolytic condenser. The caked electrolytic layer adjacent the outer sections thereof of the condenser minimizes the passage of moisture into or out of the electrolytic condenser. The internal portion of the condenser retains its normal condition, i. e., the viscosity of the electrolyte remains undisturbed by the relatively short high temperature treatment and is preserved after the heat treatment mentioned due to the protective action of the crust or caked section induced by the heat treatment. I do not wish to be limited to the 300° range in carrying out this feature of my invention since the actual or optimum firing temperature depends upon the type of electrolyte employed and the high temperature at which the electrolyte is normally treated during the normal formation of the condenser. It is sufficient to state that the firing temperature is substantially above the maximum electrolyte temperature in the normal production of the condenser and which temperature would otherwise be injurious to the electrolyte in the vat or when directly applied to the impregnation bath. However, the firing temperature when applied to the completed condenser dries out and forms a protective crust of the outer electrolyte layer or layers of the wound condenser unit as set forth.

The absorbent property of the carrier in the so-called dry or semi-dry condenser determines to a large extent the life of the condenser, as well as its electrical properties. Heretofore, gauze and paper have been used. I have discovered that much better results can be obtained if I use absorbent Cellophane as a spacer or Cellophane in combination with gauze or paper as a spacer and thoroughly impregnating same with the electrolyte.

I have found that absorbent Cellophane is a stronger and more durable spacer and electrolyte carrier than either cloth or paper.

Accordingly, I contemplate employing absorbent Cellophane for carrying my electrolyte. The electrolyte taken up by the absorbent Cellophane seeps through its fibrous structure forming a continuous liquid stream from one to the opposite side of the electrolyte.

I claim:

1. The method of manufacturing an electrolytic condenser which comprises forming the condenser with electrodes containing a viscous electrolyte layer therebetween and subjecting the condenser for a short interval to a temperature substantially in excess of that at which the electrolyte is prepared, to produce a protective crust only at the outer sections of the condenser.

2. The method of manufacturing an electrolytic condenser which comprises forming the condenser with electrodes containing a viscous electrolyte layer therebetween and subjecting the condenser to a temperature of the order of 300 degrees F. for a short interval to produce a protective crust at the outer sections of the condenser.

3. The method of manufacturing an electrolytic condenser which comprises forming the condenser with electrodes containing a viscous electrolyte layer therebetween and subjecting the condenser to a temperature of the order of 300 degrees F. for about ten minutes to produce a protective crust at the outer sections of the condenser.

JACOB KATZMAN.